United States Patent

Marsden et al.

(10) Patent No.: US 9,215,547 B2
(45) Date of Patent: Dec. 15, 2015

(54) MULTI IMSI SYSTEM AND METHOD

(71) Applicant: Eseye Limited, Surrey (GB)

(72) Inventors: Ian Marsden, Surrey (GB); Paul Marshall, Surrey (GB)

(73) Assignee: ESEYE LIMITED, Surrey (GB)

( * ) Notice: Subject to any disclaimer, the term of this patent is extended or adjusted under 35 U.S.C. 154(b) by 77 days.

(21) Appl. No.: 13/966,350

(22) Filed: Aug. 14, 2013

(65) Prior Publication Data

US 2014/0051423 A1 Feb. 20, 2014

(30) Foreign Application Priority Data

Aug. 15, 2012 (GB) .................................. 1214548.8

(51) Int. Cl.
*H04M 3/00* (2006.01)
*H04W 4/00* (2009.01)
*H04L 29/06* (2006.01)

(52) U.S. Cl.
CPC ........... *H04W 4/001* (2013.01); *H04L 63/0853* (2013.01); *H04W 4/008* (2013.01)

(58) Field of Classification Search
CPC ... H04W 4/001; H04W 4/008; H04L 63/0853
USPC ................. 455/558, 552.1, 127.4, 553.1, 419
See application file for complete search history.

(56) References Cited

U.S. PATENT DOCUMENTS

| | | | | |
|---|---|---|---|---|
| 5,915,225 | A * | 6/1999 | Mills .............................. | 455/558 |
| 6,490,679 | B1 * | 12/2002 | Tumblin et al. ................ | 713/155 |
| 8,515,488 | B2 * | 8/2013 | Hillier et al. ................... | 455/551 |
| 8,954,111 | B2 * | 2/2015 | Geary et al. ............... | 455/552.1 |
| 2005/0282584 | A1 * | 12/2005 | Faisy ............................. | 455/558 |
| 2007/0154014 | A1 * | 7/2007 | Aissi et al. .................... | 380/249 |
| 2007/0286373 | A1 * | 12/2007 | Pailles et al. ............. | 379/142.03 |
| 2009/0068988 | A1 * | 3/2009 | Cofta ............................. | 455/411 |
| 2009/0191843 | A1 * | 7/2009 | Mardiks ........................ | 455/405 |
| 2009/0191918 | A1 * | 7/2009 | Mardiks ........................ | 455/558 |
| 2009/0287589 | A1 * | 11/2009 | Fivel ............................... | 705/28 |
| 2010/0203921 | A1 * | 8/2010 | Hannu et al. .................. | 455/558 |
| 2010/0210304 | A1 * | 8/2010 | Huslak .......................... | 455/558 |
| 2010/0317320 | A1 * | 12/2010 | Sakargayan ................... | 455/410 |
| 2011/0165896 | A1 * | 7/2011 | Stromberg et al. ........... | 455/466 |
| 2012/0142314 | A1 | 6/2012 | Mohammed | |
| 2012/0264425 | A1 * | 10/2012 | Krishnamoorthy et al. .. | 455/434 |
| 2012/0282924 | A1 * | 11/2012 | Tagg et al. ................. | 455/432.1 |
| 2013/0178187 | A1 * | 7/2013 | Middleton .................... | 455/405 |
| 2013/0290714 | A1 * | 10/2013 | Hans et al. .................... | 713/168 |
| 2013/0295998 | A1 * | 11/2013 | Zheng et al. .................. | 455/558 |
| 2014/0051422 | A1 * | 2/2014 | Mittal et al. .................. | 455/419 |

FOREIGN PATENT DOCUMENTS

| | | |
|---|---|---|
| WO | WO 2011/023008 | 3/2011 |
| WO | WO 2011/036484 | 3/2011 |
| WO | WO 2011/041913 | 4/2011 |

* cited by examiner

*Primary Examiner* — Charles Shedrick
(74) *Attorney, Agent, or Firm* — Leason Ellis LLP

(57) ABSTRACT

A multi-IMSI SIM 2 includes a CPU 9 and code 8 arranged to select one of the IMSIs and a network for data communication. The selection may in particular be on the basis of network signal strength, reliability, and/or cost.

3 Claims, 4 Drawing Sheets

MULTI IMSI SYSTEM AND METHOD

FIELD OF INVENTION

The present invention relates to a system and method for use with a Multi-IMSI SIM.

BACKGROUND ART

Wireless communication systems require identifiers to identify mobile devices over networks such as GSM networks, 3G networks, 4G networks and the like. A SIM (subscriber identity module) is conventionally used to store the indentification number, typically referred to as an IMSI.

A SIM may be provided in the form of a card, a SIM card, or alternatively in the form of a chip simply mounted in wireless apparatus by any other way, for example by being soldered to a circuit board.

When roaming, automatic rules are used to select a network. The network provider provides a list of preferred networks and the SIM automatically selects a network from the available networks in any location according to the preference list.

More recently, SIMS with multiple IMS1's have been marketed, in particular for use by international travelers. Such a SIM includes two IMSIs, typically local in two different countries, for example the US and the UK. The user may select which IMSI is required by typing in a different password on power up for each IMSI. In this way, the user may select a suitable IMSI depending on the user's location.

WO2011/041913 describes an extension of this idea to a system for remote monitoring of a meter or other remote asset; a SIM is provided with multiple IMSIs.

However, the use of multiple identities causes issues in a number areas, including selection of the correct IMSI, which may be less easy than it at first appears. For example, many networks restrict which services are available to roaming SIMs so simply finding an apparently valid network may deliver a voice capability but not an adequate data capacity. Further, where a replacement IMSI is downloaded over air there is a risk of the SIM ending up with no valid IMSIs which means that there is no further connectivity, and hence no further possibility of communicating with the device which then loses all functionality.

The present application is concerned with addressing some of these difficulties.

SUMMARY OF INVENTION

According to the invention, there is provided a wireless device having a wireless modem, for wireless communication with a wireless network; at least one subscriber identity module, SIM, where the subscriber identify module may be arranged to store a plurality of IMSIs; and a network selection SIM app comprising computer program code.

Note that the code runs on a processor in the SIM. This enables the SIM card to appear as a conventional SIM card with a single IMSI to the mobile device 10 and so the SIM card can be used in conventional mobile devices with no additional code or applications in the device.

In one embodiment, the SIM is arranged to send environment information by a side channel to an update server and to receive update information updating one or more IMSIs and/or the network selection information from the update server.

By using a side channel rather than a data channel updating is possible even in the event that a conventional data channel is unavailable or fails.

The side channel may be USSD signalling, SMS message, or other communication channel such as a quarantine channel. The side channel is used to communicate environment information, such as the networks available, and to receive information back from an update server based on the environment information. For example, the side channel may be used to identify one or more networks offering GSM coverage in the location of the mobile device and the update server may respond by providing an IMSI suitable for use with that network. Alternatively or additionally the information received back from the update server may include updated network selection rules permitting suitable networks to be selected to achieve a data communication using an available network.

Note that if a data connection is available the wireless device may optionally use the data connection, not the side channel, to contact the update server if required.

BRIEF DESCRIPTION OF DRAWINGS

Embodiments of the invention will now be described, purely by way of example, with reference to the accompanying drawings, in which.

DETAILED DESCRIPTION

Apparatus

Figure 1:
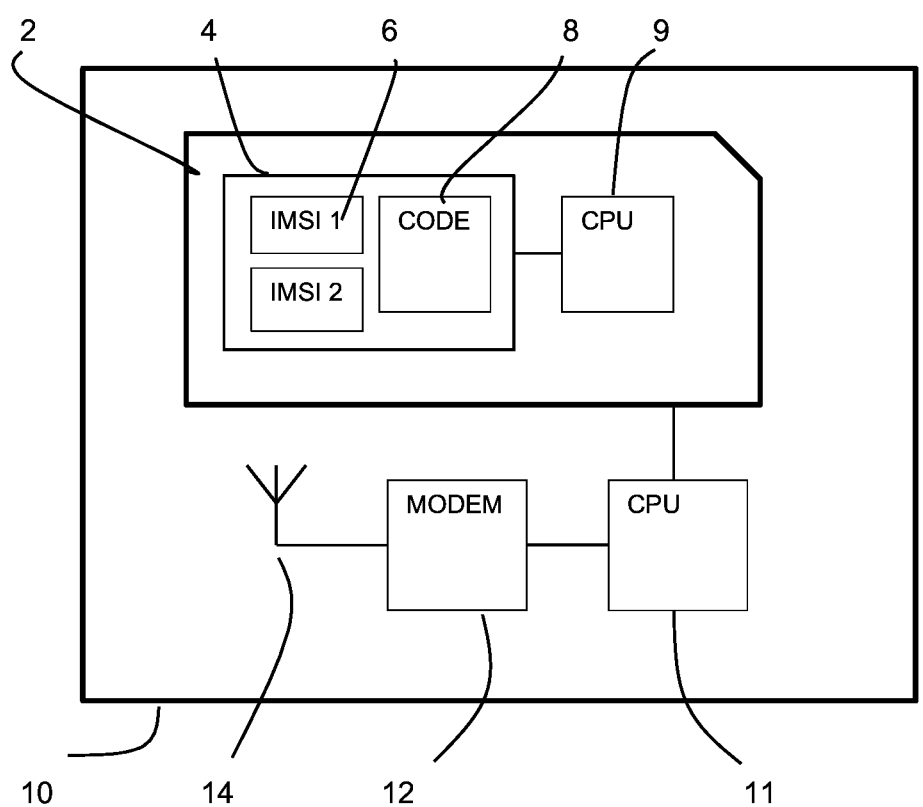
FIG. 1 shows a schematic drawing of a first embodiment of a SIM inside a mobile device.

Referring to FIG. 1, a card 2 is provided which stores, in memory 4, a plurality of IMSI numbers 6 as well as code 8 for causing the card to carry out various functions as set out below. The code 8 may include in particular SIM apps, i.e. code for running on card 2.

In the embodiment shown, the card 2 also contains a processor 9. Thus, the card 2 may be referred to as a UICC (Universal Integrated Circuit Card) according to the 3G standard. However, such a card is frequently referred to as a SIM (subscriber identity module) card and the present application uses this terminology, referring to card 2 as a "SIM" 2.

Note that in alternative embodiments the circuitry and code shown on card 2 is provided not in card format but on an integrated circuit chip which may be mounted on a circuit board by soldering or the like.

The SIM 2 is mounted in device 10 which may be any apparatus requiring data connectivity over the wireless mobile telephone network. For example, the apparatus may be a datalogger for capturing data and delivering it to a server over the cellular network, a message display which may be updated remotely by sending messages over the cellular network, or a mobile router. Although such a device may be referred to as a mobile device, since it communicates with mobile telephony services, the device may, in use, be fixed in place. The device 10 includes processor 11 which is adapted to run code.

The SIM 2 communicates with wireless modem 12 in device 10.

Figure 2:
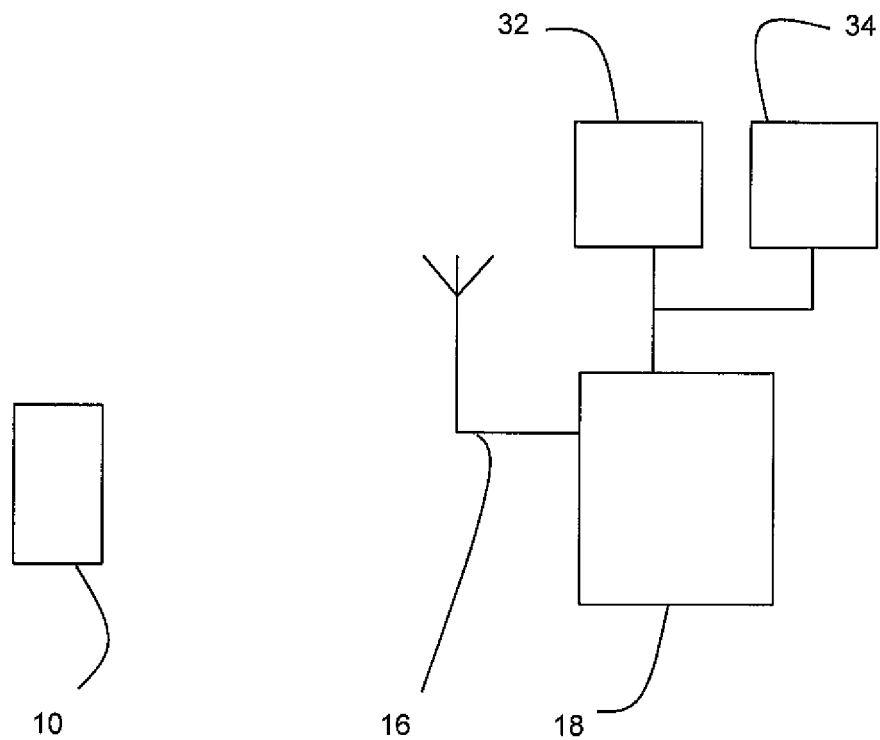
FIG. 2 shows a schematic drawing of a mobile device and base station.

The wireless modem 12 is connected to antenna 14 which communicates with a base antenna 16 and base station 18 (FIG. 2) wirelessly using the IMSI as identification. In order to allow initial connectivity, the device 10 is shipped with at least one IMSI already stored in the SIM chip 2; without an IMSI the device cannot communicate.

Conventionally, at the point the SIM card is fitted the final destination of the device must be already known. However, at the point of manufacture of a device with a multi-IMSI chip, it is not necessary to know the final location of the device or preferred networks.

The SIM 2 in the example sends an update request 22 (FIG. 4) to update server 32 via base station 18. The update request includes environment information. Typically, the environment information includes information about which networks are available and the signal strength of those networks. Other information may also be provided, for example location information if available.

The communication with the update server 32 updates the network selection data available to the SIM app. In more detail, the update server 32 receives the environment information and replies with an update message 24 which updates the network selection algorithm, typically by updating network selection information. Alternatively or additionally, a new IMSI may be provided if required to access an available network.

After this, a data connection is made 20.

The SIM app may in particular be programmed to send the update request including environment information through a side channel in the case that the SIM app is unable to make a data connection.

Where a data connection is available, the SIM app may in embodiments make the data connection and then use that data connection to update the SIM app from time to time, reserving the side channel approach for when a data connection is not available.

Optionally, the SIM app also sends update requests from time to time even when a data connection is available. This allows the network selection data to be updated. For example, reliability of networks frequently changes over time and cost also changes from time to time and the network selection data can be updated to take account of that.

Further optionally, the update request is not always made before making a data connection. In embodiments, the request is only made if there is a difficulty making the connection. Thus, the device can start up stably and quickly if required.

Base Station Functionality

The base station 18 and servers 32,34 have significant functionality that will now be described.

The location of each device and connectivity information is monitored on an ongoing basis. This takes into account the expected communication pattern. For example for a data logger that submits a message every hour, a missed message may be noted.

This allows the update server to determine when a mobile network is not providing an acceptable level of service and hence to update the selection rules as required. The data may be correlated in a number of ways, for example grouped by mast, network, country and interconnect.

The data collected may include USSD data, weather data collected from the internet, mobile network operator messages and emails and other relevant data. This may enable analysis of failed messages to be carried out.

By monitoring on a continued basis, issues that may cause a problem later can be identified. For example increases in latency on a particular network may indicate that the network is suffering increasing levels of congestion, and may soon begin to deliver unacceptable levels of performance.

The monitoring may also be used for the basis of billing users, for example by address of server contacted, or traffic type used. Specifically where a single connection is used for multiple uses, the cost of data may be different for different usage. Data Bytes transmitted to a telemetry server may be included in a monthly charge, and unbilled; Data bytes to other internet locations may be charged at another rate while data bytes that match the SIP protocol are charged at a different rate.

Further, payment record may be used to adapt services. For a user with medical monitoring equipment it may not be appropriate to stop all functionality if a bill remains unpaid for a short period, but it may be appropriate to reduce functionality apart from emergency messages.

The update server has a variety of data input regarding the cost of using various available networks. This includes, where appropriate, the cost of sending SMS messages as well as the cost of using a data connection.

The update server then calculates, for each device, a network selection algorithm for that apparatus. The result may depend on a number of factors, including cost, and reliability of networks. This is particularly important for apparatus that has to function reliably. The calculation may take into account whether the reliability is required in a number of different locations, such as medical monitoring software, or in a fixed location, as may be the case for a data logger.

The update server then determines updated network selection data for transmitting the network selection algorithm to the device.

In particular, the update server may update a white list/black list of providers that may be used, and by which IMSI each of the providers should be accessed. Information about whether the signal strength information should be taken into account is also provided. The information is provided in the form of network selection data which is transmitted to the device using SMS, a data connection or by USSD depending on the available methods of communicating to the device.

Further, in appropriate cases one or more of the IMSI numbers of a device may need to be changed. In this case, the update server determines this and transmits this update information either as part of the network selection data or using a separate message.

Connections to Update Server

The use of side channels other than the main data connection is suitable in the case that a data connection is not available.

However, in a preferred embodiment, the first preference for a side channel data connection is an alternative, quarantined data connection. In this example, the SIM 2 contains code for establishing a quarantined connection to base station 18, using roaming if necessary. The quarantined connection has limited data connectivity and in particular only data regarding network selection, routing, updating the IMSI and moving the home network over the air is permitted. This may be achieved at the network end by allowing only such communications with the IMSI. Alternatively, or additionally, the SIM may be programmed not to allow user data connections with the quarantined connection. Thus, the quarantined connection is used to update the SIM and not for the transmission of user data to and from the device. The IMSI used for the quarantine connection will be referred to as the quarantine IMSI—typically this IMSI will only be used for managing the device, though in alternative embodiments this IMSI can also be used to make a data connection.

In embodiments, the quarantined data connection uses a subset of the data connection standards available to the device. For example, in the case that the wireless modem is arranged to select from a first set of network standards including 2G, 2.5G (GPRS), Edge, 3G or 4G standards, preferring the highest available standard, the quarantined data connection may use a more limited set of standards, for example 2.5G or EDGE. Such standards may have higher availability worldwide and lower cost, and the amount of data updated may not require the use of higher speed standards. In the case of such embodiments, it is the code on the SIM that selects the second set of network standards.

Figure 4:
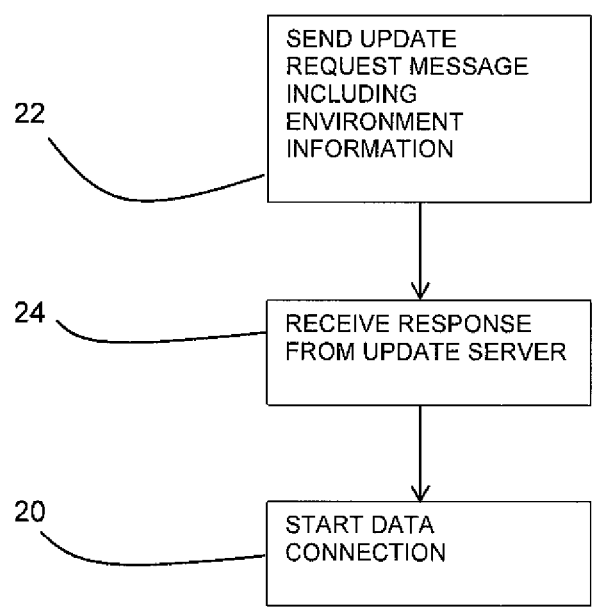
FIG. 4 is a flow diagram schematically showing setting up a connection.

As shown in FIG. 4, before the data connection is started 20, a query message is sent 22 to the base station 18 over the air using the quarantine IMSI, and data 24 is received back from the base station which is used to provide an additional IMSI if required, and to update the network selections. The Query message may be repeated regularly, or only when the main data connection fails.

Alternatively, the quarantine connection may be enabled to allow a full user data connection to be made through the quarantined connection but this might permit misuse in certain cases. In general terms, it is better to use the quarantined connection to update the SIM apps and other data stored in the SIM, the quarantined connection being separate from the data connection used to communicate user data between the device and the base station.

Figure 3:
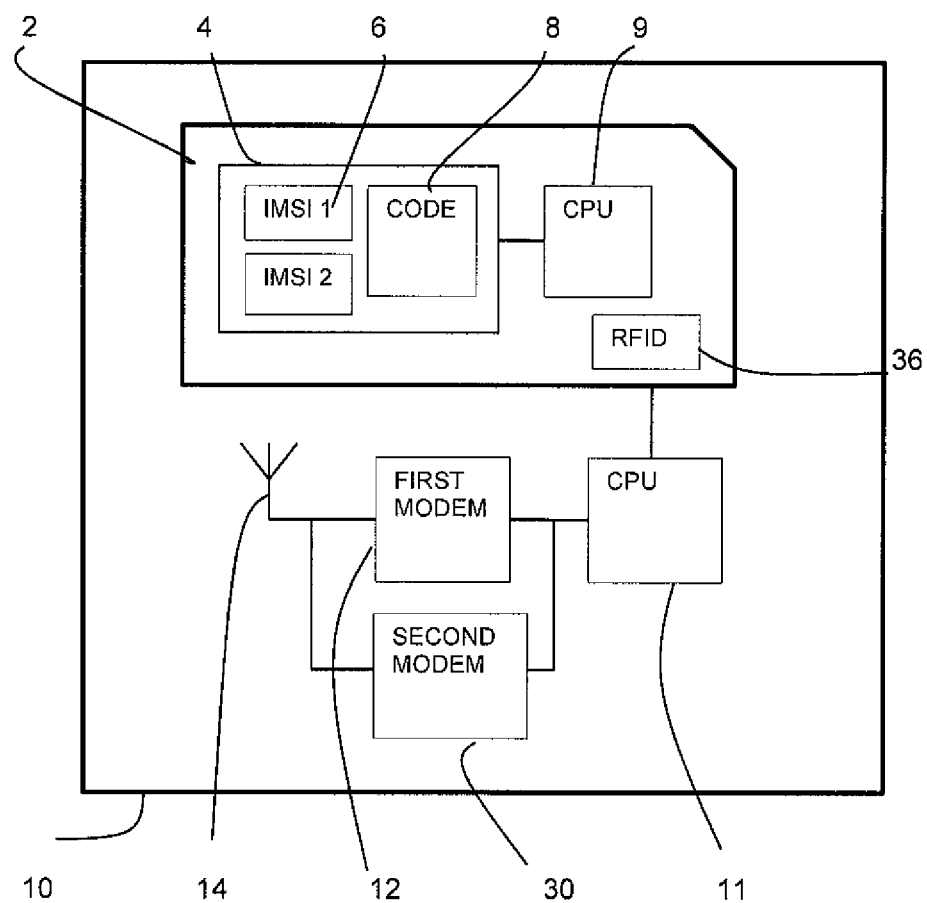
FIG. 3 shows a schematic drawing of a second embodiment of a SIM inside a mobile device.

In an alternative embodiment, illustrated in FIG. 3, a second modem 30 is provided. The second modem 30 is a modem for an alternative data connection technology, for example a higher cost and/or more stable and/or widely available data network. For example, the second modem network might be more expensive to use, or have reduced performance when compared to communication the primary modem (12) For example, in the case that the data connection from modem 12 is a 3G, 3.5G or 4G connection (a first set of data standards) the second modem 30 may be a 2G or 2.5G (GPRS) modem (a second set of data standards). This may be particularly important where modem 12 is for a new connection, such as 4G, which may well not be available in all locations. In this case, the quarantine IMSI is used to make a connection through the second modem 30 to report back the availability of service through the primary modem (12) and allow remote management of the primary SIM/modem.

This has a number of advantages. Firstly, the alternative data network may be selected for maximum availability over the geographic area intended. Although there may be an advanced 3.5G or 4G network available, there is no guarantee for more modern networks that coverage will be available for a particular network. If only a 4G modem 12 is installed, and the quarantine IMSI does not allow connectivity over an available 4G network in the location the apparatus 10 is installed, there is no way of getting connectivity.

The second quarantine modem 30 may in particular be used with a quarantine IMSI.

In particular embodiments a quarantine IMSI is an IMSI activated for a network with wide coverage, such as GPRS however this may have higher data costs, or lower performance and not meet the application price/performance requirements. In this way, the cost of the connectivity can be contained whilst still allowing remote access for configuration and device/connection management.

A first SIM app is provided in the SIM to carry out network monitoring and selection. A SIM app is a sequence of software instructions provided on the SIM to carry out certain functions on data available on the SIM or accessible to the SIM.

The first SIM app has the functionality of carrying out a network scan. Presently, network scans are generally carried out by firmware in the apparatus in which the SIM is mounted but this does not make the data obtained by the scan available to the SIM.

The first SIM app also determines the available signal strength using each of a plurality of networks. Under the traditional approach used in conventional SIMs, networks are selected from available networks, on the basis of a preference list which means that if a first network in the preference list is available it will be selected regardless of the signal strength at a particular location. In contrast, the SIM app in the present embodiment selects the network to be used based on additional criteria, including for example the relative signal strengths of the available networks.

The first SIM app contains a much more sophisticated network selection algorithm than the conventional approach, which for roaming simply has a single flag to indicate if roaming is enabled or disabled. In addition to network strength, the first SIM app also allows roaming selectively, using multiple flags to allow roaming in particular countries, and but also by network. This is enabled by network selection data which may include a number of factors. For example, the network selection data can include reliability and cost data about a large number of networks and this reliability and cost data can be used to select preferred networks. This will be further discussed below.

The network selection algorithm can be reprogrammed over the air to allow a list of preferred networks to be provided dynamically. This is done using an update server 32 connected to the base station. The update server 32 generating the list can take into account factors such as which network operators in which location provided good data service at any one time. In particular, conventional SIMs may be set up to allow only certain services. For example, a SIM intended for use in a machine to machine data transfer environment may be set up not to allow a voice call. In the invention, such lists may be reprogrammed over the air.

To reprogram over air, data communications channel to an update server 32 is required. The update server 32 may be integrated with the APN or be a separate server. The SIM app is programmed to transfer data either using a side, signalling channel such as USSD or alternatively by setting up a data connection to the APN and transferring data over the data connection. If the data connection fails, the data transfer falls back to use a signalling channel such as USSD.

The data connection may use Remote Authentication Dial In User Service (RADIUS), which may be implemented in the modem. Accordingly, to use the data connection, communication between SIM card and modem is required. To initiate communication, the SIM causes the modem to issue an Access-Request message to the APN, which will typically be replied to by an Access-Challenge message requiring user name and password. The presence of the Access-Challenge message indicates that a data connection to the home network is available.

If the data network is not available, another signalling channel is used. To determine if USSD is available, the SIM card causes the modem to attempt to contact the home location register (HLR), the database of SIM cards and mobile numbers. If this is achieved, the SIM can use USSD for data transfer.

The SIM has a relatively complex algorithm for data communication to cope with the situation that certain data transfer mechanisms are not available in a particular location. Thus, in addition to USSD and a data connection, the SIM app may also communicate using an SMS message. If there is no USSD or data connection available, SMS may be used. SMS is widely available.

Routing is a significant issue for a device with more than one IMSI. Each IMSI will typically correspond to a different mobile network. Although it is possible that for any individual IMSI, the same IP address can be allocated each time the device connects, it is likely that the device will be assigned a different IP when the IMSI changes in order to meet the requirements of individual mobile network operators.

At present, mobile operators use IPv4 addresses for connected mobile devices. In the future, IPv6 addresses may be used.

As will be appreciated, the number of IPv4 addresses is limited and mobile devices use local IPv4 addresses for example (10.X.X.X). In a large network, addresses may be shared. There is a need to resolve routing problems to get data to devices using multiple IMSI SIMs.

Two methods of identifying individual devices where there are two IP allocation issues to consider are contemplated. Routing is achieved by routing server 34 connected to base station 18. Although this is shown separately to update server 32, in practice the update server 32 and routing server 34 may be the same.

Firstly, it is possible that a first mobile network operator, MNO1, requires the SIMs to be allocated an IP address with in a range e.g. 10.0.0.1→10.0.0.255 and a second mobile network operator MNO2 requires the SIMs to be allocated IP addresses in the range 172.0.0.1→172.0.0.255

Alternatively it is possible that MNO1 requires the SIMs to be allocated an IP address with in a range e.g. 10.0.0.1→10.0.0.255 and MNO2 also requires that the connections are allocated IP addresses in the same range.

In this case, it is possible that Device A will have one IP address while using an IMSI from MNO1 but this IP address may already be allocated to another device using an IMSI from MNO2.

It can be seen that the introduction of IMSIs from additional MNOs with overlapping or distinct IP address ranges adds more complexity to the issue.

By way of a first method, an IP address is allocated against each physical SIM card. This IP address is unique for each customer of the Multi-IMSI SIM card provider. When the customer routes a packet to this address, it is mapped using static NAT to the IP address allocated to the IMSI currently in use, and routed via the appropriate MNO. Similarly packets from the SIM card are mapped from the IP address in use on the Mobile Network onto the IP address allocated to the Physical SIM card before being routed to the customer's Server. When the IMSI is changed, it is possible to detect the authentication request from the device joining the network, and use this information to update the static NAT and routing tables.

In this case, the static NAT and routing tables may be part of a redirection server that can be integrated into the update server or separately.

By way of the second method, the SIM is given a FQDN name e.g. 8944535234.eseye.net such that at any time the customer may use this name to identify the current IP address and routing rules for the IMSI in use at any one time.

Alternative Embodiments

In an alternative embodiment, rather than having a single SIM with mutliple IMSIs, a plurality of SIMs can be provided.

In the case of a quarantine SIM chip 30, this may be an integrated circuit chip hard wired to the circuit board, not a conventional card. This quarantine SIM chip is provided to provide data connection back to the base station to allow connectivity for reprogrammable SIM chip 2 to be programmed. This quarantine SIM chip may be used to make a quarantine connection back to the home network as discussed above to allow device management including programming of the main SIM.

In the event of having multiple SIM chips, some form of selection is required. This may be provided through electronic switches that direct the wiring from the modem to one of a the available SIM cards In a further embodiment, the SIM card manufacturer may place multiple instances of the SIM card circuits and the electronic switch within a conventional SIM card form factor. This may be done simply be manufacturing two conventional SIM card circuits on a single piece of silicon. Conventional SIM cards have one terminal that is not used. In this embodiment, this terminal is used as a selection terminal to determine which of the SIM card circuits are connected to the modem. The modem or other management process outputs a signal to the selection line to select a SIM card.

Where the SIM is a conventional SIM card, the mobile number or IMSI may be found by reading the back of the card. In contrast, where the SIM is a chip mounted directly on a circuit board, the IMSI may not be printed on the packaging and be unknown. This may be the case in particular where there is a quarantine SIM chip hard wired to the circuit board.

Even if the SIM chip is a card, there may be difficulty in accessing an internally mounted card to read the IMSI.

Thus, the SIM chip may be provided with an RFID tag 36 (FIG. 3) to enable remote reading of information. Further, the RFID tag may be used to provide an RFID communication to allow the device to be reprogrammed locally if the device gets into a state without a valid IMSI.

An alternative way of programming SIMs is to use a single spare connector to provided a debug input and/or output for use in programming, debugging and repair.

Both these approaches allow an advanced SIM card to be used with a low cost modem, yet the added value of management of the IMSI may be achieved.

A further embodiment includes a separate management modem 30, in addition to the conventional modem 12. Conventionally, the SIM card controls the modem. Instead of providing all the functionality described above in SIM apps on the SIM card, which as will be appreciated requires a re-engineered or at least reprogrammed, in this alternative embodiment some or all of the additional functionality is provided as the management modem 30.

A further feature that may be included is a SIM app which itself requests from a server using a communication method such as USSD, SMS or data a rate and an invoice. Conventionally, billing and invoicing matters are triggered centrally, for example by the provision of a monthly bill. The SIM app may provide functionality to obtain rate and permission information dynamically to enable the device to decide how to proceed. For example, in the event of data transfer, some data transfer may be non-essential and only worth transmitting over a low cost link. The SIM app can integrate rate information and determine which data should be permitted, and what data should be blocked.

The invention also includes including the functionality within the modem or application software.

For example a vehicle telemetry system may send detailed high resolution timing information from the engine to the vehicle manufacturer when data is cheap—e.g. on the home network. However when abroad and the data is more expensive this data is omitted, and only telemetry data is permitted. Further, should the device determine that the only network connection available is not a partner network, and the data rates are exceptionally high, data could be restricted further and limited to just location updates.

Applications of the invention are varied. One application is a managed wireless router, i.e. a router that has several conventional ethernet outputs but which communicates wirelessly to a base station. In this case, management data may be transmitted over USSD using a hard-wired quarantine SIM and user data transmitted using a separate SIM with one or more different IMSI identities.

The invention claimed is:

1. A wireless device, comprising:
   a wireless modem, for wireless communication with a wireless network;
   at least one subscriber identity module, SIM, where the subscriber identify module is arranged to store a plurality of IMSIs;
   a network selection SIM app comprising computer program code arranged to run on the SIM to use rules and network selection data to select an IMSI and network combination by determining in the SIM the available networks, and selecting an IMSI and an available network based on determined network information and the network selection data;
   wherein the SIM is arranged to send environment information by a side channel to an update server and to receive update information updating one or more IMSIs and/or the network selection information from the update server, and
   wherein the side channel is a quarantined data connection to the update server, and the quarantined connection cannot be used to transmit user data, and
   wherein the wireless device includes a quarantine IMSI initiating the quarantine connection and at least one user IMSI initiating a user data connection.

2. A wireless device, comprising:
   a wireless modem, for wireless communication with a wireless network;
   at least one subscriber identity module, SIM, where the subscriber identify module is arranged to store a plurality of IMSIs;
   a network selection SIM app comprising computer program code arranged to run on the SIM to use rules and network selection data to select an IMSI and network combination by determining in the SIM the available networks, and selecting an IMSI and an available network based on determined network information and the network selection data;
   wherein the SIM is arranged to send environment information by a side channel to an update server and to receive update information updating one or more IMSIs and/or the network selection information from the update server, and
   wherein the side channel is a quarantined data connection to the update server, and the quarantined connection cannot be used to transmit user data, and
   wherein the wireless modem is a user wireless modem transmitting and/or receiving user data, the wireless device further comprising a quarantine wireless modem initiating the quarantined wireless connection.

3. A wireless device, comprising:
   a wireless modem, for wireless communication with a wireless network;
   at least one subscriber identity module, SIM, where the subscriber identify module is arranged to store a plurality of IMSIs;
   a network selection SIM app comprising computer program code arranged to run on the SIM to use rules and network selection data to select an IMSI and network combination by determining in the SIM the available networks, and selecting an IMSI and an available network based on determined network information and the network selection data;
   wherein the SIM is arranged to send environment information by a side channel to an update server and to receive update information updating one or more IMSIs and/or the network selection information from the update server, and
   wherein the SIM comprises a SIM update a which comprises code to:
   make an update connection by attempting to make a data connection to an update server;
   if the data connection succeeds, using the data connection as the update connection; and otherwise:
   attempting to make a connection using the side channel to the update server, and
   wherein the side channel is a USSD channel, and,
   wherein the SIM update app code controlling the wireless device with SMS as the side channel if the USSD connection does not succeed.

* * * * *